United States Patent

[11] 3,548,819

[72] Inventors Otho L. Davis;
Carmen M. Falcone, Duke University, Durham, N.C. 27706; Fred R. Dunning, 3800 Oakes Road, Brecksville, Ohio 44141
[21] Appl. No. 730,068
[22] Filed May 17, 1968
[45] Patented Dec. 22, 1970

[54] THERMAL-PRESSURE SPLINT
8 Claims, 4 Drawing Figs.
[52] U.S. Cl. .................................................. 128/82.1, 128/87, 128/402, 150/2.4, 150/2.5, 150/2.6
[51] Int. Cl. ................................................... A61f 5/04
[50] Field of Search .......................................... 128/82.1, 254, 258, 379, 384, 402, 87, 157

[56] References Cited
UNITED STATES PATENTS
2,562,121  7/1951  Poux ............................ 128/402UX
3,171,410  3/1965  Towle et al. ................... 128/157UX

*Primary Examiner*—L. W. Trapp
*Attorney*—Baldwin, Egan, Walling and Fetzer

ABSTRACT: A splint for application to an injured human limb or human body portion in which a therapeutic material is carried in a sealed compartment and applied under suitable fluid pressure, such as by means of air pressure, against the injured limb and/or body part. The splint includes a fluidtight chamber into which a therapeutic material is deposited such as a material to create heat and/or cold and a second chamber into which a pressure fluid may be inserted such as, for example, air. The splint is placed over the injured human limb and/or body part in such manner that the chamber containing the therapeutic material overlies the injured portion. The pressure exerted by the pressure fluid chamber is directed against the therapeutic chamber so as to urge said therapeutic chamber under pressure against the injured body part so as to enable the thermal condition generated by the material therein to be exerted against the said injured part. The overlying and surrounding pressure fluid chamber of the splint is also positioned to surround the injured human limb or body part and provides temporary immobility to the said injured body part so as to prevent any further aggravation of the injury thereto.

This invention relates generally to body splints and more particularly to a thermal-pressure body splint which is especially designed to exert a thermal condition such as heat and/or cold under pressure against an injured human limb and/or other body part.

PATENTED DEC 22 1970
3,548,819
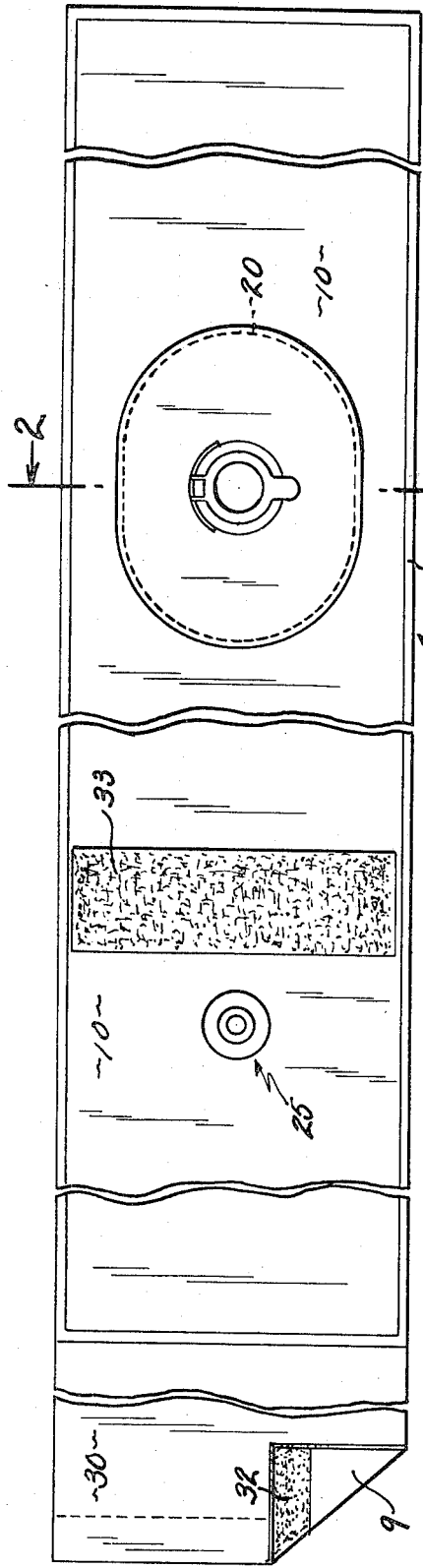
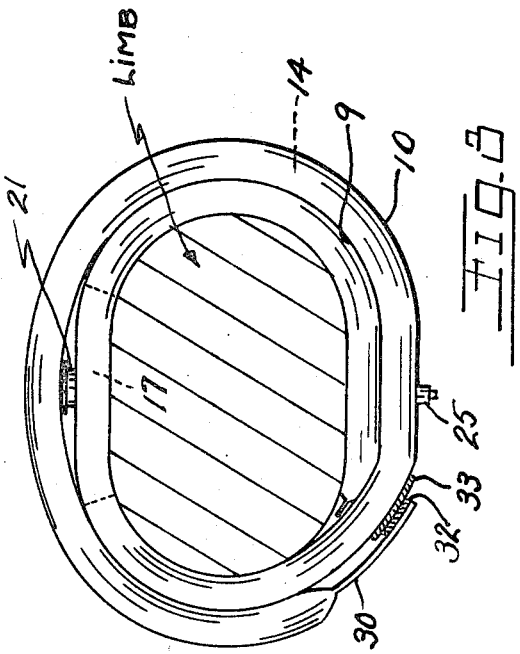
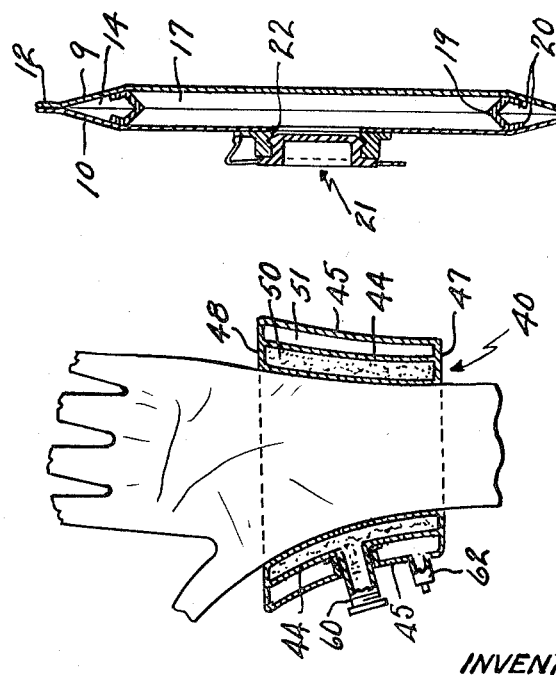
INVENTORS.
OTHO L. DAVIS
CARMEN M. FALCONE
FRED R. DUNNING
BY Baldwin, Egan, Walling & Fetzer
ATTORNEYS

THERMAL-PRESSURE SPLINT

Another object of the present invention is to provide a new and improved body splint specially designed to provide for a temporary application of thermal therapy to an injured portion of the body such as a human limb, the application of such thermal therapy being accomplished under pressure suitable to enable the thermal therapy to be applied directly to the injured body portion while also enabling the injured body part to be temporarily substantially immobilized to prevent further aggravation thereto.

Another object of the present invention is to provide a new and improved thermal body splint especially designed for the application to an injured human limb and/or other body part whereby to provide for the application of thermal therapy to the injured body part under a suitable magnitude of pressure which may be temporarily applied so as to enable the injured body part to be readily accessible for more detailed medical treatment.

Another object of the present invention is to provide a new and improved thermal-pressure body splint which may be reusable over an extended period of time and for the application to several areas of the human body.

Additional objects and advantages of the thermal-pressure splint of the present invention will be apparent to one skilled in the art to which it pertains and upon reference to the following disclosure of several preferred embodiments thereof and which are illustrated in the accompanying drawings and wherein:

FIG. 1 is a plan view of one embodiment of thermal-pressure splint of the present invention showing the same in its open position in which therapeutic material may be readily deposited therein;

FIG. 2 is a vertical sectional view taken along the lines 2—2 as shown in FIG. 1;

FIG. 3 is a vertical sectional taken through a human limb, such as an arm, and showing the thermal-pressure splint of FIG. 1 in its operative position thereon; and FIG. 4 is a fragmentary view of a human hand with a second embodiment of thermal-pressure splint of the present invention shown placed over the wrist portion of the arm representing the injured part thereof and showing the splint in sectional view to more readily illustrate its internal construction.

Referring now particularly to FIGS. 1 and 2, the thermal-pressure splint of the present invention is identified in its entirety by the reference numeral 4 and is seen to be generally rectangular in overall configuration as disposed in its open condition as shown particularly in FIG. 1.

The splint 4 consists of two rectangular sheets of flexible material such as vinyl and which are identified as a bottom sheet 9 and a top sheet 10. The bottom and top sheets 9 and 10 are sealed together about their periphery as is indicated at 12 to thereby form a substantially airtight chamber as identified in FIG. 2 by the reference numeral 14.

A fluidtight chamber as identified in its entirety by the reference numeral 17 is formed within the splint 4 and comprises a circular partition wall 19 disposed within the airtight chamber 14 being sealed to the bottom and top sheets 9 and 10 as is particularly shown at 20 in FIG. 2.

A reclosable plug 21 is shown attached to the top sheet 10, the latter being apertured as at 22 to thus provide access to the chamber 17 as thus formed. As shown in FIG. 2, the plug 21 is in its closed or sealed position, thus sealing the chamber 17 from atmosphere and to prevent leakage of the therapeutic material therefrom. The plug 21 is adapted to be pulled to its open position to thereby enable therapeutic materials such as those creating heat and/or cold to be deposited in the aforementioned chamber 17.

A suitable reclosable air valve 25, as seen in FIG. 1, is mounted on the top sheet 10 and communicates with the air chamber 14. Any suitable pressure fluid such as air is intended to be introduced into the chamber 14 to thereby form a balloonlike expansion of the chamber effective to exert pressure onto adjoining areas or surfaces.

The splint 4, as seen in FIG. 1, is generally rectangular and is somewhat similar to the form taken by the well known wrap type of pressure bag used for measuring blood pressure.

In use, therapeutic material is placed into the chamber 17 through the plug 21 and the latter is then closed. Therapeutic materials which have been actually used to create cold are ice cubes, crushed ice, industrial prilled ammonium nitrate plus water whereas hot water has been used to create heat, other heat creating chemicals also being well known. As now known in the art, for sprained limbs, the application of cold material to the injured limb should be used to slow circulation which aids in preventing further swelling of said limb.

Assuming that a sprain has occurred to a person's arm, for example, and with reference to FIG. 3, a cold producing material is disposed in the chamber 17 and the chamber is then closed.

The splint 4 is then placed over the injured limb so that the chamber 17 lies over the sprain area. The splint 4 is then wrapped around the arm over the chamber 17 and the end portion 30 thereof, which may have any suitable securement means such as a strip of Velcro material attached thereto as indicated at 32 and which is engageable with a companion Velcro strip 33 disposed on the top sheet 10, is locked in place therebetween.

Air or any other suitable pressure fluid is then introduced through valve 25 sufficient to inflate the chamber 14 whereby the material in chamber 17 is forced against the injured area to effect maximum therapeutic action by said thermomaterial in said chamber 17. The valve 25 may be any suitable type which permits air or other fluid pressure to be introduced and captured within the chamber 14. The pressure need not be more than the magnitude obtainable by a human merely blowing through said valve, after which the valve may be closable by hand.

When the therapeutic material has become exhausted, the valve 25 may be opened to release the pressure fluid from chamber 14 and the splint 4 may then be removed from the injured limb.

Thereafter, the material may be removed from chamber 17 and if desired replaced and the splint then reapplied to said limb.

Another embodiment of splint incorporating the present invention is shown in its entirety in FIG. 4 by the reference numeral 40.

As herein shown splint 40 comprises basically a cylindrical tube within a tube construction, being formed of three layers or sheets of material, as for example vinyl, identified at 43, 44, 45.

The pair of layers 43 and 44 and likewise the pair of layers 44 and 45 are spaced apart by end walls 47, 48 to form an inner generally cylindrical chamber 50 and an outer generally cylindrical chamber 51 which encircles the said inner chamber.

The layer 44 is provided with a reclosable plug 60 which thus communicates with inner chamber 50. In like manner layer 45 is provided with a reclosable valve 62 which communicates with outer chamber 51.

In use, the splint may be placed over the injured limb, for example a sprained wrist, and thermomaterial is then introduced through plug 60 into inner chamber 50.

Air or other suitable pressure fluid may then be introduced into the outer chamber 51 whereby pressure is exerted against the therapeutic material in the inner chamber 50 to cause it to press against the injured limb to thereby effect maximum therapeutic results therefrom.

As will also be now realized, the splint of the present invention as shown particularly in FIGS. 3 and 4 is also capable when in place on the injured limb to at least partially immobilize the same so as to prevent further aggravation to the injury caused thereto.

Having thus described several preferred embodiments of the present invention it will be understood that the same is susceptible to various modifications, arrangements and combinations of parts as are defined in the following claims.

We claim:

1. A thermopressure splint for therapeutic application to an injured human limb or the like comprising a body having a first chamber defining a fluid retaining pouch into which therapeutic material may be disposed, a second chamber in said body, said splint being adapted to be disposed over the injured limb to place the first chamber over the area of the injured limb, means in said second chamber for permitting pressure fluid to be introduced therein whereby said second chamber is inflated sufficiently to force the first chamber in pressure engagement with the area of the injured limb.

2. A thermopressure splint as is defined in claim 1 and wherein the first chamber is substantially fluid tight and is provided with reclosable plug means to permit the disposition of therapeutic material therein.

3. A thermopressure splint as is defined in claim 1 and wherein the means in said second chamber is valve means to permit the introduction of pressure fluid into said second chamber.

4. A thermopressure splint as is defined in claim 1 and wherein the body is formed to be placed over the injured limb and at least partially wrapped therearound.

5. A thermopressure splint as is defined in claim 1 and wherein the body is generally rectangular and formed to be at least partially wrapped around the injured limb with the first chamber directly over the injured area of the limb and the second chamber disposed as to press the first chamber into engagement with said area.

6. A thermopressure splint as is defined in claim 1 and wherein the body is substantially cylindrical being formed of a tube within a tube construction.

7. A thermopressure splint as is defined in claim 6 and wherein the innermost tube is provided with means to introduce therapeutic material therein.

8. A thermopressure splint as is defined in claim 6 and wherein the outermost tube is provided with means to introduce pressure fluid therein.